United States Patent [19]
Nguyen et al.

[11] Patent Number: 6,144,716
[45] Date of Patent: Nov. 7, 2000

[54] NUCLEAR FUEL ASSEMBLY GRID WITH DIAGONAL FUEL RETAINING SPRINGS

[75] Inventors: Quang M. Nguyen, Irmo; Edmund E. DeMario, Columbia, both of S.C.

[73] Assignee: Westinghouse Electric Corp., Pittsburgh, Pa.

[21] Appl. No.: 08/887,016

[22] Filed: Jul. 2, 1997

[51] Int. Cl.[7] .................................................. G21C 3/356
[52] U.S. Cl. ............................................................ 376/442
[58] Field of Search .................................... 376/438, 441, 376/442

[56] References Cited

U.S. PATENT DOCUMENTS

| | | | |
|---|---|---|---|
| 4,725,402 | 2/1988 | Krawiec | 376/438 |
| 4,803,043 | 2/1989 | DeMario et al. | 376/442 |
| 4,879,090 | 11/1989 | Perrotti et al. | 376/442 |
| 4,900,508 | 2/1990 | Anthony | 376/438 |
| 5,139,736 | 8/1992 | Bryan | 376/442 |
| 5,188,797 | 2/1993 | Bryan | 376/438 |
| 5,265,140 | 11/1993 | Perrotti | 376/438 |
| 5,303,276 | 4/1994 | DeMario et al. | 376/442 |

*Primary Examiner*—Daniel D. Wasil

[57] ABSTRACT

A support grid for laterally maintaining the relative position of elongated fuel elements within a fuel assembly for use within a core of a nuclear reactor. The grid is formed in the shape of a lattice with the intersecting lattice members defining a plurality of cells, most of which respectively support the nuclear fuel elements. The remaining cells support nuclear control rod guide tubes and instrumentation thimbles. The cells supporting the nuclear fuel elements are provided with diagonally positioned springs on two adjacent walls. The springs support the fuel elements against dimples which protrude from the opposite cell walls. The adjacent, diagonal springs in each fuel element cell are inclined in opposite directions. The springs are formed from narrow, parallel slits in the cell wall that terminate along a line parallel to the line of intersection with the adjacent wall. The spring slits continue along that parallel line in a direction away from the spring to increase its flexure. The lattice is formed in an "egg-crate" pattern with the orthogonal members fitting over opposing vertical slits in the adjoining straps. The vertical slits are extended more than half way over the width of the straps to further increase the flexure of the retaining springs.

9 Claims, 2 Drawing Sheets

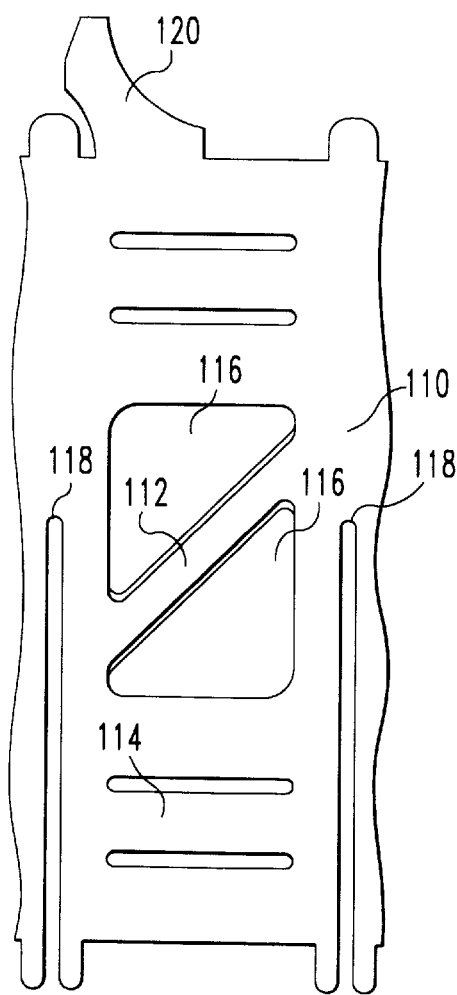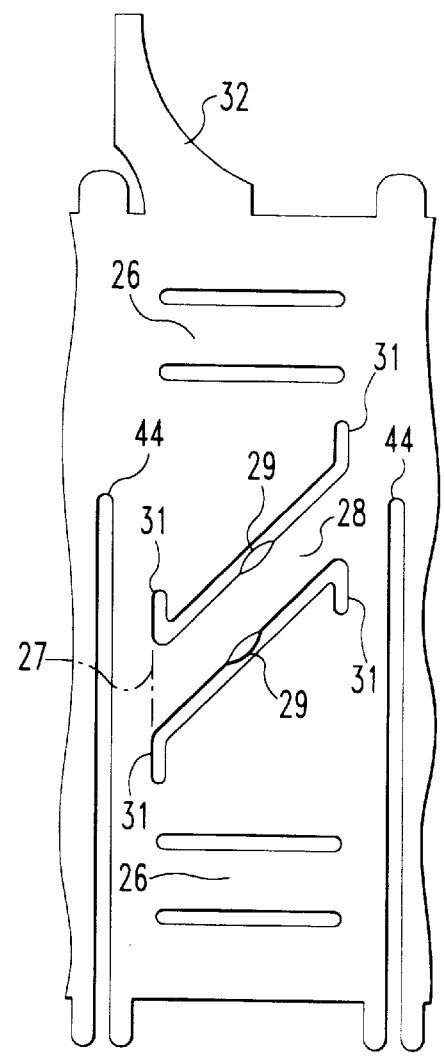
FIG.2
PRIOR ART
FIG.3

NUCLEAR FUEL ASSEMBLY GRID WITH DIAGONAL FUEL RETAINING SPRINGS

CROSS-REFERENCE TO RELATED APPLICATIONS

This Application is related to U.S. patent application, Ser. No. 08/887,017 (Docket No. ARF96-003), filed contemporaneously herewith.

BACKGROUND OF THE INVENTION

1. Field of the Invention

This invention relates generally to nuclear reactor fuel element support grids and more particularly to support grids that include diagonal retaining springs.

2. Background Information

Fuel assemblies for nuclear reactors are generally formed from an array of elongated fuel elements or rods maintained in a laterally spaced relationship by a skeletal support structure, including a plurality of longitudinally spaced support grids, a lower end fitting, and an upper end fitting. The fuel assembly skeleton also includes guide tubes and instrumentation thimbles, which are elongated tubular members symmetrically interspersed among and positioned coextensive with the fuel element locations. The guide tubes and instrumentation thimbles are fixedly connected to the support grids to provide the structural coupling between the other skeletal members. The support grids each define an array of fuel rod support compartments or cells and have a perimeter that is configured in one of a number of alternate geometrical shapes that is dictated by the reactor core design. Nuclear fuel grids for commercial pressurized water reactors employing square fuel assemblies can typically have between 14 and 17 cells per side. Other polygonal array designs are also employed, such as the hexagonal array illustrated in U.S. Pat. No. 5,303,276, issued Apr. 12, 1994.

One typical fuel element support grid design includes a generally polygonal perimeter surrounding an interior lattice array. A plurality of fuel element compartments or cells within the perimeter are defined by a number of evenly spaced, slotted, interlocked lattice forming members or straps, which are welded to the perimeter and joined to each other by small nugget welds at the ends of their lines of interception along the slotted locations.

Each interior lattice forming member is slotted over one half of its width along its lines of intersection with the other grid forming members of the array. The members are assembled and interlocked at the lines of intersection with the slot in one member fitting into the opposing slot in the crossing member in an "egg-crate" fashion. This egg-crate design provides a good strength to weight ratio without severely impeding the flow of coolant that passes through the grid in an operating nuclear reactor. The lattice-forming members typically include projecting springs and dimples for engaging and supporting the fuel elements within some of the grid compartments. The springs provide axial, lateral and rotational restraint against fuel rod motion during reactor operation under the force of coolant flow, during seismic disturbances, or in the event of external impact. These spacer grids also act as lateral guides during insertion and withdrawal of the fuel assemblies from the reactor.

One of the operating limitations on current reactors is established by the onset of film boiling on the surfaces of the fuel elements. The phenomenon is commonly referred to as departure from nuclear boiling (DNB) and is affected by the fuel element spacing, system pressure, heat flux, coolant enthalpy and coolant velocity. When DNB is experienced, there is a rapid rise in temperature of the fuel element due to the reduced heat transfer that occurs under these conditions as a result of the gaseous film that forms on portions of the fuel element surface, which can ultimately result in failure of the fuel element if it was to continue. Therefore, in order to maintain a factor of safety, nuclear reactors must be operated at a heat flux level somewhat lower than that at which DNB occurs. This margin is commonly referred to as the "thermal margin."

Nuclear reactors normally have regions in the core that have a higher neutron flux and power density than other regions. The variation in flux and power density can be caused by a number of factors, one of which is the presence of control rod channels in the core. When the control rods are withdrawn, these channels are filled with coolant, a moderator, which increases the local moderating capacity and thereby increases the power generated in the adjoining fuel. In these regions of high power density known as hot channels, there is a higher rate of enthalpy rise than in other channels. These hot channels set the maximum operating conditions for the reactor and limit the amount of power that can be generated, since it is in these channels that the critical thermal margin is first reached.

The prior art has attempted to reduce the variation in power density across the core and thus increase the DNB performance by providing coolant flow deflector vanes as an integral part of the fuel support grids. The vanes improve performance by increasing heat transfer between the fuel rods and the coolant downstream of the vane locations. The vanes are especially beneficial in the regions adjoining the hot channels, which are the fuel element positions adjacent to the control rod guide tube locations.

To take full benefit of the vanes, it is also desirable to streamline the remaining grid components, i.e., the lattice straps, including the springs, dimples and welds, to reduce the turbulence generated upstream from the vanes. Other objectives in optimizing fuel grid designs include minimizing grid pressure drop and maximizing grid load carrying strength. The springs, which provide the force for holding the fuel rods in position, are normally formed from cut-out sections of the lattice forming members that protrude into the fuel rod support compartments. The spring force applied is designed as a balance between the forces necessary to provide the axial, lateral and rotational restraint required to hold the fuel elements in position and that which will score or otherwise damage the surface of the fuel element as it is threaded into the assembly during manufacture. To both avoid damage to the fuel element and provide maximum restraining forces it is desirable to maximize the contact area that the spring has with the fuel rod as well as the flexure of the spring. A preferred method for achieving maximum contact area is to provide a diagonal spring which extends from a lower portion of one of the walls of the fuel support compartment to a diagonally opposed upper portion of the same wall as illustrated in the prior art design illustrated in FIG. 2. FIG. 2 shows a single wall section of a grid lattice strap 110 with a diagonal spring 112. The cut-out sections 114 protrudes into an adjacent fuel element support compartment and forms the dimple for providing point contact support for an adjacent fuel rod which is pressed against the dimple by a similarly formed spring extending inwardly from the opposite wall of that adjacent compartment. Typically a fuel rod support compartment is provided with springs on at least two walls and dimples on the opposing walls to center the fuel rods and provide maximum coolant flow around their surface. The prior art also provided cut-out sections 116, shown in FIG. 2, to reduce the mass of wall material around the spring and thus increase it flexibility.

As shown in patent application Ser. No. 08/887,017 (Docket ARF96-003 it is desirable to locate the mixing vanes 120 over the grid compartments that support the fuel element, to enhance heat transfer. It has been found however, that the vanes increase the pressure drop in the fuel support compartments. That creates a pressure differential between the fuel support compartments that adjoin the control rod guide tube and instrument thimble locations and the tube and thimble locations, that do not have mixing vanes. As a result, during operation the coolant flowing through the grid compartments adjoining the guide tube and thimble locations tends to seek the path of least resistance and flow out the windows 116 on either side of the diagonal 112 spring and up through the thimble and guide tube locations. The result is reduced heat transfer in the area that most needs it and less efficient use of the vanes.

Accordingly, an improved grid structure is desired that improves DNB performance. It is an object of this invention to achieve that result by minimizing the leakage path around the grid springs, while maintaining the spring's flexibility. It is a further object of this invention to improve upon the flexibility of the diagonal spring design without reducing the crushable strength of the grid.

SUMMARY OF THE INVENTION

The structure of this invention overcomes some of the deficiencies of prior art grid spring designs by reducing the area open to cross flow in the fuel support cells while maintaining the flexibility of the grid springs. In accordance with this invention the spring is formed from narrow, diagonal, parallel slits in the lattice walls. In the preferred embodiment added spring flexibility is achieved by extending the vertical slits in the lattice straps to more than half of the width of the strap, at the points of intersection with the orthogonal straps. In addition, in a diagonal spring configuration the slits in the lattice walls that form the springs are extended at their terminations, in a direction parallel with the line of intersection of the adjacent wall and away from the spring. Thus the flexibility of the springs are enhanced with reduced open wall area available for cross flow.

These and other objects, features, and advantages of the present invention will become apparent to those skilled in the art upon a reading of the following description when taken in conjunction with the drawings wherein there is shown and described illustrative embodiments of the invention.

BRIEF DESCRIPTION OF THE DRAWINGS

While the specification concludes with claims specifically pointing out and distinctly claiming the subject matter of the invention, it is believed the invention will be better understood from the following description, taken in conjunction with the accompanying drawings wherein:

FIG. 2 is a partial side elevation of a wall portion of a prior art nuclear fuel assembly grid lattice strap shown uncoupled from the intersecting lattice members; and FIG. 3 is a partial side elevation of a wall portion of a nuclear fuel assembly grid lattice strap incorporating the features of this invention, shown uncoupled from the intersecting lattice members.

DESCRIPTION OF THE PREFERRED EMBODIMENT

Figure 1:
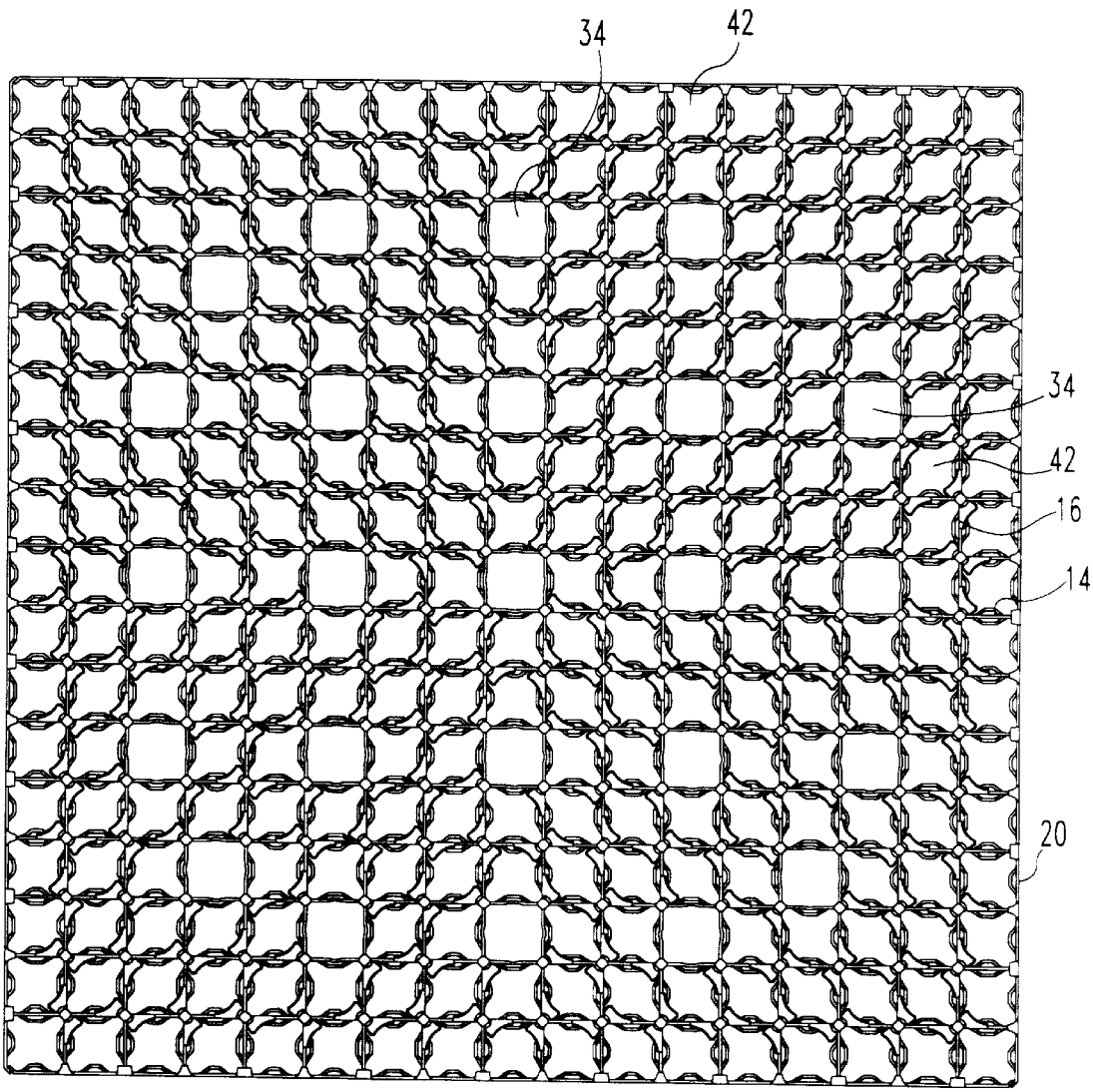
FIG. 1 is a top elevational view of the grid support assembly embodying the features of this invention.

In a typical nuclear reactor heat is generated within the core of the reactor vessel as a result of nuclear fission. The heat is employed to generate steam, which in turn drives turbine-generators to produce electricity. In a pressurized water nuclear reactor the heat in the core is transferred to a coolant moderator, commonly borated water, which is transported under pressure to a steam generator that places the coolant in heat transfer relationship with a secondary fluid. The secondary fluid is vaporized into steam which is used to drive the turbine-generators.

The nuclear fuel within the core is typically encapsulated in cylindrical, elongated rods often referred to as fuel elements. The fuel elements are maintained in a polygonal array and, in one preferred embodiment, extend in a longitudinal direction to a length of approximately fourteen feet. The array is generally referred to as a fuel assembly and is bounded by an upper and lower nozzle and maintained in position and appropriately spaced by fuel element support grids that are secured at spaced locations along the longitudinal length of the assembly.

Interspersed among the fuel elements within the assembly are control rod guide tubes and instrumentation thimbles that are symmetrically arranged in place of fuel element locations and are used to guide the control rods and act as conduits for in-core instrumentation. The control rods are used to control the fission process by absorbing neutrons in the core that would otherwise react with the nuclear fuel. The control rods are movable into and out of the core through the guide tubes to control the level of reactivity.

The coolant within the core that flows from a region below the fuel, up through each fuel assembly and out its nozzle. The coolant is a moderator that slows the speed of the neutrons to increase the efficiency of the fission process. When the control rods are removed from the core the corresponding thimble tubes are filled with the coolant moderator which increases the fission reactions in the fuel in the cells surrounding those guide tubes. A more detailed understanding of the operation of a pressured water nuclear reactor can be had by referring to U.S. Pat. No. 5,303,276 issued Apr. 12, 1994, entitled "FUEL ASSEMBLY INCLUDING DEFLECTIVE VANES FOR DEFLECTING A COMPONENT OF THE FLUID STREAM FLOWING PAST SUCH A FUEL ASSEMBLY."

FIG. 1 is a top plan view of a fuel assembly support grid 10 incorporating features of this invention and having a perimeter 12 formed in the shape of a square. It should be appreciated, however, that the concepts of this invention can be applied to fuel element support grids employing different shaped perimeters, such as the hexagonal fuel assembly illustrated in the previously referenced U.S. Pat. No. 5,303,276. The grid assembly illustrated in FIG. 1 is constructed from an evenly spaced, parallel array of lattice grid straps 14, which intersect with a similar, orthogonally positioned, evenly spaced, parallel array of lattice grid straps 16. The lattice array is welded to a peripheral strap 20 which forms the perimeter of the grid. The walls of the straps, intermediate the intersections with the corresponding orthogonal straps, define cells through which the fuel assemblies, guide tubes and instrumentation thimbles pass.

FIG. 1 illustrates a 17 by 17 array of cells, though it should be appreciated that the application of the principles of this invention are not affected by the number of fuel elements in an assembly. The lattice straps which form the orthogonal members 14 and 16 shown in FIG. 1, are substantially identical in design. While the lattice straps 14 and 16 are substantially identical, it should be appreciated that the design of some lattice straps 16 will vary from other lattice straps 16, as well as some straps 14 vary from other straps 14, to accommodate guide tube and instrument thimble locations. Reference character 42 in FIG. 1 identifies those cells which support fuel elements and reference character 34 shows the cells that are attached to the guide tubes and instrumentation thimbles. As shown in FIG. 3 most walls of the cells that accommodate fuel elements are provided with a number of stamped, protruding segments that are tooled by appropriate dies as is known and used in the industry. The upper and lower stamped segments 26 bulge out in one direction and form dimples for supporting the fuel elements against juxtaposed diagonal springs which protrude from the opposite cell wall. The remaining centrally located, stamped section 28, in the same wall as the previously described dimples, bulges in the opposite direction into the adjacent cell and forms a diagonal spring for pressuring the fuel element against dimples 26 which protrude into the that adjacent cell from its opposite wall.

FIG. 3 illustrates a portion of the lattice strap that forms the wall to a single cell and extends just over the position where it would intersect with the corresponding, adjacent, orthogonal lattice straps to which it would be attached. In accordance with this invention, as shown in FIG. 3, the diagonal springs 28 are formed from two narrow parallel cuts in the cell wall that extend at a diagonal substantially over the width of the wall. The narrow slits which form the spring terminate at either end so that a phantom line 27 drawn between the ends of the adjacent slits runs parallel to the line of intersection of the cell walls. In this way the only impediment to the coolant flow at any point along the spring is limited to the thickness of the spring material. Diagonal springs constructed in this fashion maximize the contact area with the fuel element while minimizing any impediment to coolant flow. Preferably the spring is chamfered at its edges 29 where it contacts the fuel element, to reduce the potential for damaging the surface of the fuel rods as they are inserted into the grid. To increase the flexure of the spring and soften its impact, the slits which form the spring are extended at each end in a direction parallel to the line of intersection with the adjacent wall and away from the spring as illustrated by reference character 31.

Mixing vanes 32 extend from the upper edges of the lattice straps at some of the segments which form the walls of the cells 42 through which the fuel assemblies pass. In accordance with this invention, the mixing vanes are arranged in a predetermined pattern that can be better appreciated by referring to patent application Ser. No. 08/887,017 (docket ARF96-003), filed concurrently herewith.

As shown in FIG. 1 the cells 34 support the guide tubes and instrumentation thimbles through which the control rods and the in-core instrumentation pass. The cells 34 differ from the fuel element support cells 42 in that they have none of the support members 26 or 28 protruding into their interior, or mixing vanes 32 extending from their walls. The mixing vanes result in a pressure drop across the cells that support the fuel elements, which in turn causes a pressure differential between those adjacent cells that support the guides tube or the instrument thimbles. By reducing the opening between cells, this invention minimizes the affect of that pressure differential.

By reducing the opening in the cell walls this invention increases the mass of material in the walls supporting the springs, over that of the prior art configuration shown in FIG. 1, which adds to the stiffness of the wall and improves the grids overall strength. The increased mass also adds to the stiffness of the spring. Accordingly, it is preferable to add further flexure to the spring to lessen the likelihood that the fuel elements will be scored during assembly. In a traditional fuel assembly lattice grid structure, as shown in FIG. 2, the straps are provided with slits 118 which extend from the bottom of the strap to half way up its height, at the intersection where it meets with the straps running in the orthogonal direction. The intersecting straps are provided with similar slits 118 that extend from their top surface to half way down the strap. The straps are then fitted together at their slits with one slit sliding over the other at each intersection to form an egg-crate pattern that locks the intersections and defines the cells. In accordance with this invention, As shown in FIG. 3, the slits 44 are extended more than halfway across the straps to add greater flexure to the springs when the straps are welded at their lines of intersection.

Accordingly, this invention provides an improved fuel assembly incorporating a support grid spring design that optimizes reactor coolant flow during operation in a manner that improves DNB performance, reduces pressure drop and improves grid crush resistance strength.

What is claimed:

1. A nuclear fuel assembly having a support grid for maintaining a plurality of elongated nuclear fuel elements in a parallel, spaced array, the grid having a lattice structure which defines a plurality of cells through which the fuel elements are respectively supported, each of the cells having a plurality of walls which intersect at corners and surround the corresponding fuel element at the support location, at least one wall in the cells supporting the fuel elements includes a diagonal spring extending into the cell from a point near a lower portion of the grid proximate one corner of the wall to a point near an upper portion of the grid proximate the other corner of the wall, and wherein the spring is formed from a cut-out section of the cell wall formed from narrow, substantially parallel slits in the wall along the diagonal of the spring in a manner that minimizes the cross flow of coolant between cells at the spring location during reactor operation.

2. The nuclear fuel assembly of claim 1 wherein the walls of the cells are formed from an intersection of lattice straps where one of the intersecting straps has a slit extending from its upper end along the line of intersection and the other intersecting lattice strap has a slit extending from its lower end along the line of intersection, wherein the slits intersect and fit over each other in an egg-crate configuration and each slit extends over more that half the height of the corresponding lattice strap so as to soften the force of the springs against the fuel elements.

3. The nuclear fuel assembly of claim 2 wherein the straps are welded together at their lines of intersection so that their corresponding adjoining edges are substantially aligned.

4. The nuclear fuel assembly of claim 2 wherein the ends of the abutting slits of intersecting straps are spaced from one another.

5. The nuclear fuel assembly of claim 1 wherein the support grid spring is attached to the cell wall along a vertical line parallel to the intersection of cells walls, wherein the restriction to coolant flow at any point along the spring is limited to the thickness of the spring material.

6. The nuclear fuel assembly of claim 1 wherein the diagonal slits in the cell walls which form the spring terminate at either end in slits in the cell walls running substantially parallel to the adjacent walls in a direction away from the spring.

7. The nuclear fuel assembly of claim 1 wherein the diagonal spring has a chamfer along at least a portion of one edge.

8. A nuclear fuel assembly having a support grid for maintaining a plurality of elongated fuel elements in a parallel, spaced array, the grid having a lattice structure which defines a plurality of cells through which the fuel elements are respectively supported, each of the cells having a plurality of walls which intersect at corners and surround the corresponding fuel element at the support location, at least one wall in the cells supporting the fuel elements includes a spring for supporting the fuel element, the spring is formed from two parallel slits in the cell wall, where the slits run on an angle to the line of intersection of the cell walls and terminate at each end in a slit that runs parallel to the line of intersection in a direction away from the spring.

9. The fuel assembly of claim 8 where the parallel slits that form the spring are at forty five degree angle with the line of intersection of the cell walls.

* * * * *